United States Patent
Luo et al.

(10) Patent No.: US 10,035,908 B1
(45) Date of Patent: Jul. 31, 2018

(54) PROCESS FOR PREPARING BLENDS OF TRANS-1,4-POLYBUTADIENE AND SYNDIOTACTIC 1,2-POLYBUTADIENE

(71) Applicant: Bridgestone Corporation, Chuo-ku (JP)

(72) Inventors: Steven Luo, Copley, OH (US); Sheel Agarwal, Solon, OH (US); John D Rensel, Tallmadge, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 15/149,816

(22) Filed: May 9, 2016

Related U.S. Application Data

(63) Continuation of application No. 14/559,001, filed on Dec. 3, 2014, now abandoned.

(60) Provisional application No. 61/911,212, filed on Dec. 3, 2013.

(51) Int. Cl.
   *C08L 47/00* (2006.01)

(52) U.S. Cl.
   CPC .......... *C08L 47/00* (2013.01); *C08L 2205/025* (2013.01); *C08L 2207/10* (2013.01); *C08L 2314/08* (2013.01)

(58) Field of Classification Search
   CPC ............... C08L 47/00; C08L 2205/025; C08L 2207/10; C08L 2314/08
   See application file for complete search history.

(56) References Cited

U.S. PATENT DOCUMENTS

| | | |
|---|---|---|
| 3,842,111 A | 10/1974 | Meyer-Simon et al. |
| 3,873,489 A | 3/1975 | Thurn et al. |
| 3,935,180 A | 1/1976 | Sugiura et al. |
| 3,978,103 A | 8/1976 | Meyer-Simon et al. |
| 3,997,581 A | 12/1976 | Pletka et al. |
| 4,002,594 A | 1/1977 | Fetterman |
| 4,379,889 A | 4/1983 | Ashitaka et al. |
| 4,476,287 A | 10/1984 | Maehara et al. |
| 4,619,982 A | 10/1986 | Jenkins |
| 4,645,809 A | 2/1987 | Bell |
| 4,931,376 A | 6/1990 | Ikematsu et al. |
| 5,227,425 A | 7/1993 | Rauline |
| 5,283,294 A | 2/1994 | Hsu et al. |
| 5,580,919 A | 12/1996 | Agostini et al. |
| 5,583,245 A | 12/1996 | Parker et al. |
| 5,663,396 A | 9/1997 | Musleve et al. |
| 5,674,932 A | 10/1997 | Agostini et al. |
| 5,684,171 A | 11/1997 | Wideman et al. |
| 5,684,172 A | 11/1997 | Wideman et al. |
| 5,696,197 A | 12/1997 | Smith et al. |
| 5,717,022 A | 2/1998 | Beckmann et al. |
| 5,719,207 A | 2/1998 | Cohen et al. |
| 5,866,171 A | 2/1999 | Kata |
| 5,876,527 A | 3/1999 | Tsuruta et al. |
| 5,931,211 A | 8/1999 | Tamura |
| 5,971,046 A | 10/1999 | Koch et al. |
| 6,184,168 B1 | 2/2001 | Lynch |
| 6,197,888 B1 | 3/2001 | Luo |
| 6,320,004 B1 | 11/2001 | Luo |
| 6,342,552 B1 | 1/2002 | Hergenrother et al. |
| 6,525,118 B2 | 2/2003 | Hergenrother et al. |
| 6,579,949 B1 | 6/2003 | Hergenrother et al. |
| 6,590,017 B1 | 7/2003 | Hergenrother et al. |
| 6,608,145 B1 | 8/2003 | Lin et al. |
| 6,667,362 B2 | 12/2003 | Robert et al. |
| 6,683,135 B2 | 1/2004 | Cruse et al. |
| 6,699,813 B2 | 3/2004 | Luo et al. |
| 6,765,066 B2 | 7/2004 | Ozawa |
| 7,351,776 B2 | 4/2008 | Tartamella et al. |
| 2009/0043046 A1 | 2/2009 | Luo et al. |
| 2016/0304707 A1* | 10/2016 | McCauley et al. ... C08F 136/06 |

FOREIGN PATENT DOCUMENTS

EP 890606 A1 1/1999

OTHER PUBLICATIONS

Ashitaka, et al. "Syndiotactic 1,2-Polybutadiene with Co-CS2 Catalyst System. I. Preparation, Properties, and Application of Highly Crystalline Syndiotactic 1,2-Polybutadiene" Journal of Polymer Science: Polymer Chemistry Edition, vol. 21, pp. 1853-1860 (1983).
Nir, et al. "Blends of Crystallizable Polybutadiene Isomers" Rubber Chemistry and Technology, vol. 66, pp. 295-303 (1993).
Nir, et al. "Mechanical Properties of Blends of Crystallizable Polybutadienes Containing Amorphous Polybutadiene Diblock Copolymers" Rubber Chemistry and Technology, vol. 67, pp. 342-347 (1994).

\* cited by examiner

*Primary Examiner* — Nathan M Nutter
(74) *Attorney, Agent, or Firm* — Meredith E. Hooker; Arthur M. Reginelli

(57) ABSTRACT

A process for preparing a blend of trans-1,4-polybutadiene and syndiotactic 1,2-polybutadiene, the process comprising the steps of (i) polymerizing 1,3-butadiene in the presence of a lanthanide-based catalyst to form a polymerization mixture including trans-1,4-polybutadiene, where the lanthanide-based catalyst includes (a) a lanthanide-containing compound, and (b) an organomagnesium compound; and (ii) polymerizing 1,3-butadiene in the presence of an iron-based catalyst within the polymerization mixture including trans-1,4-polybutadiene to form syndiotactic 1,2-polybutadiene within the polymerization mixture including trans-1,4-polybutadiene and thereby produce a blend of trans-1,4-polybutadiene and syndiotactic 1,2-polybutadiene; where the iron-based catalyst includes (a) an iron-containing compound, (b) an organomagnesium compound, and (c) a silyl phosphonate.

18 Claims, No Drawings

PROCESS FOR PREPARING BLENDS OF TRANS-1,4-POLYBUTADIENE AND SYNDIOTACTIC 1,2-POLYBUTADIENE

This application claims the benefit of U.S. Non-provisional application Ser. No. 14/559,001, filed Dec. 3, 2014, and U.S. Provisional Application Ser. No. 61/911,212, filed Dec. 3, 2013, which are incorporated herein by reference.

FIELD OF THE INVENTION

One or more embodiments of the present invention relate to a process for producing a blend of trans-1,4-polybutadiene and syndiotactic 1,2-polybutadiene.

BACKGROUND OF THE INVENTION

Syndiotactic 1,2-polybutadiene is a crystalline thermoplastic resin that has a stereoregular structure in which the side-chain vinyl groups are located alternately on the opposite sides in relation to the polymeric main chain. Syndiotactic 1,2-polybutadiene is a unique material that exhibits the properties of both plastics and rubber, and therefore it has many uses. For example, films, fibers, and various molded articles can be made by utilizing syndiotactic 1,2-polybutadiene. It can also be blended into and cocured with natural and synthetic rubbers. In general, incorporating syndiotactic 1,2-polybutadiene into rubber compositions that are utilized in tires greatly improves the green strength of those compositions.

Trans-1,4-polybutadiene is similar to syndiotactic 1,2-polybutadiene in that it is also a crystalline thermoplastic resin. It can also be blended into and cocured with natural and synthetic rubbers. Trans-1,4-polybutadiene can be used in the formulation of rubber compositions to increase green strength and improve processability of those compositions. Trans-1,4-polybutadiene can also been used in golf ball covers, asphalt binders, and wire coatings.

Polymer blends have often been used to bring together the desirable properties of different polymers. Blending different polymers and yet preserving their individual properties is an attractive and inexpensive way of obtaining new polymeric materials from a limited palette. Polymer blends may show superior properties to those of individual polymers. Therefore, polymer blends have been used in a variety of products including disposable coffee cups, car bumpers, and medical devices. Blends of two crystalline polymers such as trans-1,4-polybutadiene and syndiotactic 1,2-polybutadiene can be prepared by dissolving the two polymers in the same solvent under high temperatures followed by recovering the polymer blend from the solution. This method, however, is inconvenient and time consuming. Blends of two crystalline polymers may also be produced by mixing the two polymers together at high temperatures in known mixing equipment such as an extruder, a Banbury mixer, a Brabender mixer, or a kneader. These high-temperature mixing procedures, however, have certain drawbacks including high processing costs, inadequate mixing, as well as polymer degradation and crosslinking at elevated temperatures. Due to the high vinyl content of syndiotactic 1,2-polybutadiene, polymer degradation and crosslinking is a particularly severe problem for mixing syndiotactic 1,2-polybutadiene with other polymers at high temperatures.

Therefore, there exists a need to develop new methods for producing blends of syndiotactic 1,2-polybutadiene and trans-1,4-polybutadiene.

SUMMARY OF THE INVENTION

Embodiments of the present invention provide a process for preparing a blend of trans-1,4-polybutadiene and syndiotactic 1,2-polybutadiene, the process comprising the steps of (i) polymerizing 1,3-butadiene in the presence of a lanthanide-based catalyst to form a polymerization mixture including trans-1,4-polybutadiene, and (ii) polymerizing 1,3-butadiene in the presence of an iron-based catalyst within the polymerization mixture including trans-1,4-polybutadiene to form syndiotactic 1,2-polybutadiene within the polymerization mixture including trans-1,4-polybutadiene and thereby produce a blend of trans-1,4-polybutadiene and syndiotactic 1,2-polybutadiene.

Still other embodiments of the present invention provide a process for preparing a blend of trans-1,4-polybutadiene and syndiotactic 1,2-polybutadiene, the process comprising (i) introducing a lanthanide-based catalyst and 1,3-butadiene monomer to form a polymerization mixture; (ii) allowing the 1,3-butadiene monomer to polymerize to form trans-1,4-polybutadiene and thereby form a polymerization mixture including trans-1,4-polybutadiene; (iii) introducing an iron-based catalyst to the polymerization mixture including the trans-1,4-polybutadiene; and (iv) allowing the 1,3-butadiene monomer to polymerize to form syndiotactic 1,2-polybutadiene within the polymerization mixture including the trans-1,4-polybutadiene.

Still other embodiments of the present invention provide a process for preparing a blend of trans-1,4-polybutadiene and syndiotactic 1,2-polybutadiene, the process comprising (i) providing an active polymerization mixture including a propagating trans-1,4-polybutadiene polymer; and (ii) adding an iron-based catalyst to the active polymerization mixture including the propagating trans-1,4-polybutadiene polymer.

Still other embodiments of the present invention provide a vulcanizable composition comprising (i) a blend of trans-1,4-polybutadiene and syndiotactic 1,2-polybutadiene prepared by a process for preparing a blend of trans-1,4-polybutadiene and syndiotactic 1,2-polybutadiene, the process comprising the steps of polymerizing 1,3-butadiene in the presence of a lanthanide-based catalyst to form a polymerization mixture including trans-1,4-polybutadiene, and polymerizing 1,3-butadiene in the presence of an iron-based catalyst within the polymerization mixture including trans-1,4-polybutadiene to form syndiotactic 1,2-polybutadiene within the polymerization mixture including trans-1, 4-polybutadiene and thereby produce a blend of trans-1,4-polybutadiene and syndiotactic 1,2-polybutadiene, (ii) a filler, and (iii) a curative.

Still other embodiments of the present invention provide a tire component prepared by employing a blend of trans-1,4-polybutadiene and syndiotactic 1,2-polybutadiene prepared by a process for preparing a blend of trans-1,4-polybutadiene and syndiotactic 1,2-polybutadiene, the process comprising the steps of polymerizing 1,3-butadiene in the presence of a lanthanide-based catalyst to form a polymerization mixture including trans-1,4-polybutadiene, and polymerizing 1,3-butadiene in the presence of an iron-based catalyst within the polymerization mixture including trans-1,4-polybutadiene to form syndiotactic 1,2-polybutadiene within the polymerization mixture including trans-1, 4-polybutadiene and thereby produce a blend of trans-1,4-polybutadiene and syndiotactic 1,2-polybutadiene.

Still other embodiments of the present invention provide an airspring component prepared by employing a blend of trans-1,4-polybutadiene and syndiotactic 1,2-polybutadiene prepared by a process for preparing a blend of trans-1,4-polybutadiene and syndiotactic 1,2-polybutadiene, the process comprising the steps of polymerizing 1,3-butadiene in the presence of a lanthanide-based catalyst to form a polymerization mixture including trans-1,4-polybutadiene, and polymerizing 1,3-butadiene in the presence of an iron-based catalyst within the polymerization mixture including trans-1,4-polybutadiene to form syndiotactic 1,2-polybutadiene within the polymerization mixture including trans-1,4-polybutadiene and thereby produce a blend of trans-1,4-polybutadiene and syndiotactic 1,2-polybutadiene.

DETAILED DESCRIPTION OF ILLUSTRATIVE EMBODIMENTS

Embodiments of this invention are based, at least in part, on the discovery of a process for producing a blend of trans-1,4-polybutadiene and syndiotactic 1,2-polybutadiene. In one or more embodiments, the process includes polymerizing 1,3-butadiene in the presence of a lanthanide-based catalyst to form a polymerization mixture including trans-1,4-polybutadiene. Then, the process further includes polymerizing 1,3-butadiene within the polymerization mixture including the trans-1,4-polybutadiene in the presence of an iron-based catalyst to form syndiotactic 1,2-polybutadiene within the polymerization mixture including the trans-1,4-polybutadiene. In one or more embodiments, it has advantageously been found that the iron-based catalyst is not deleteriously impacted by the presence of the lanthanide-based catalyst or residues thereof, and therefore practice of this invention can be performed without isolating the trans-1,4-polybutadiene from the polymerization mixture prior to the introduction of the iron-based catalyst. The blend of trans-1,4-polybutadiene and syndiotactic 1,2-polybutadiene can be used in the manufacture of tire components and air spring bellows.

In one or more embodiments, a polymerization mixture including trans-1,4-polybutadiene is initially formed by introducing 1,3-butadiene monomer and a lanthanide-based catalyst. Polymerization of the 1,3-butadiene monomer in the presence of the lanthanide-based catalyst forms trans-1,4-polybutadiene within the polymerization mixture. The polymerization mixture may also include solvent and/or other catalyst components or modifiers. Following polymerization of the 1,3-butadiene monomer, the polymerization mixture may also include catalyst residues.

In one or more embodiments, the trans-1,4-polybutadiene may include propagating polymer, which may also be referred to as a reactive polymer. In these or other embodiments, the trans-1,4-polybutadiene may include non-propagating polymer. Propagating polymers include polymeric species that are capable of undergoing further polymerization through the addition of monomer. In one or more embodiments, the propagating polymeric species may be referred to as a pseudo-living polymer. Non-propagating polymers include polymeric species that cannot undergo further polymerization through the addition of monomer.

Following the formation of the polymerization mixture including the trans-1,4-polybutadiene, an iron-based catalyst is introduced to the polymerization mixture. Optionally, additional 1,3-butadiene monomer is added to the polymerization mixture including the trans-1,4-polybutadiene. The polymerization of 1,3-butadiene monomer in the presence of the iron-based catalyst forms syndiotactic 1,2-polybutadiene within the polymerization mixture including the trans-1,4-polybutadiene, thereby forming a blend of trans-1,4-polybutadiene and syndiotactic 1,2-polybutadiene. In one or more embodiments, the trans-1,4-polybutadiene and the syndiotactic 1,2-polybutadiene are the exclusive polymeric species within the polymerization mixture. In these or other embodiments, at least a portion of the trans-1,4-polybutadiene and the syndiotactic 1,2-polybutadiene are chemically linked, thereby forming a block copolymer. In these or other embodiments, a mixture including the trans-1,4-polybutadiene, the syndiotactic 1,2-polybutadiene, and optionally a block copolymer thereof is formed. In yet other embodiments, an interpenetrating network is formed wherein at least one polymer is intimately dispersed within the other polymer. While the exact nature of the polymers may not be known for every embodiment of this invention, the term a blend of trans-1,4-polybutadiene and syndiotactic 1,2-polybutadiene may be used to refer to all compositions including the trans-1,4-polybutadiene, the syndiotactic 1,2-polybutadiene, and optionally the block copolymers thereof.

As previously mentioned, a lanthanide-based catalyst, which may also be referred to as a lanthanide-based catalyst system, may be employed to synthesize trans-1,4-polybutadiene. In one or more embodiments, the lanthanide-based catalyst system employed to synthesize trans-1,4-polybutadiene includes (a) a lanthanide-containing compound and (b) an alkylating agent. In these or other embodiments, other organometallic compounds, Lewis bases, and/or catalyst modifiers can be employed in addition to the ingredients or components set forth above. For example, in one embodiment, a nickel-containing compound can be employed as a molecular weight regulator as disclosed in U.S. Pat. No. 6,699,813, which is incorporated herein by reference. In one or more embodiments, the lanthanide-based catalyst system is substantially devoid of halogen-containing compounds including those compounds having a labile halogen atom.

Lanthanide-containing compounds useful in the present invention are those compounds that include at least one atom of lanthanum, neodymium, cerium, praseodymium, promethium, samarium, europium, gadolinium, terbium, dysprosium, holmium, erbium, thulium, ytterbium, lutetium, and didymium. In one embodiment, these compounds can include neodymium, lanthanum, samarium, or didymium. As used herein, the term "didymium" shall denote a commercial mixture of rare-earth elements obtained from monazite sand. In addition, the lanthanide-containing compounds useful in the present invention can be in the form of elemental lanthanide.

The lanthanide atom in the lanthanide-containing compounds can be in various oxidation states including, but not limited to, the 0, +2, +3, and +4 oxidation states. In one embodiment, a trivalent lanthanide-containing compound, where the lanthanide atom is in the +3 oxidation state, can be employed. Suitable lanthanide-containing compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, and organolanthanide compounds. Specifically excluded from useful lanthanide-containing compounds are halogen-containing lanthanide-containing compounds such as, but not limited to, lanthanide halides, lanthanide pseudo-halides, lanthanide oxyhalides.

In one or more embodiments, the lanthanide-containing compounds can be soluble in hydrocarbon solvents such as aromatic hydrocarbons, aliphatic hydrocarbons, or cycloaliphatic hydrocarbons. Hydrocarbon-insoluble lanthanide-containing compounds, however, may also be useful in the present invention, as they can be suspended in the polymerization medium to form the catalytically active species.

For ease of illustration, further discussion of useful lanthanide-containing compounds will focus on neodymium compounds, although those skilled in the art will be able to select similar compounds that are based upon other lanthanide metals.

Suitable neodymium carboxylates include, but are not limited to, neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a., neodymium versatate), neodymium naphthenate, neodymium stearate, neodymium oleate, neodymium benzoate, and neodymium picolinate.

Suitable neodymium organophosphates include, but are not limited to, neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis(2-ethylhexyl) phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl) phosphate, neodymium butyl (2-ethylhexyl) phosphate, neodymium (1-methylheptyl) (2-ethylhexyl) phosphate, and neodymium (2-ethylhexyl) (p-nonylphenyl) phosphate.

Suitable neodymium organophosphonates include, but are not limited to, neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl) phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl)phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl)phosphonate, neodymium butyl (2-ethylhexyl)phosphonate, neodymium (2-ethylhexyl) butylphosphonate, neodymium (1-methylheptyl) (2-ethylhexyl)phosphonate, neodymium (2-ethylhexyl) (1-methylheptyl)phosphonate, neodymium (2-ethylhexyl) (p-nonylphenyl)phosphonate, and neodymium (p-nonylphenyl) (2-ethylhexyl)phosphonate.

Suitable neodymium organophosphinates include, but are not limited to, neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl) phosphinate, neodymium butyl (2-ethylhexyl) phosphinate, neodymium (1-methylheptyl) (2-ethylhexyl)phosphinate, and neodymium (2-ethylhexyl) (p-nonylphenyl) phosphinate.

Suitable neodymium carbamates include, but are not limited to, neodymium dimethylcarbamate, neodymium diethylcarbamate, neodymium diisopropylcarbamate, neodymium dibutylcarbamate, and neodymium dibenzylcarbamate.

Suitable neodymium dithiocarbamates include, but are not limited to, neodymium dimethyldithiocarbamate, neodymium diethyldithiocarbamate, neodymium diisopropyldithiocarbamate, neodymium dibutyldithiocarbamate, and neodymium dibenzyldithiocarbamate.

Suitable neodymium xanthates include, but are not limited to, neodymium methylxanthate, neodymium ethylxanthate, neodymium isopropylxanthate, neodymium butylxanthate, and neodymium benzylxanthate.

Suitable neodymium β-diketonates include, but are not limited to, neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Suitable neodymium alkoxides or aryloxides include, but are not limited to, neodymium methoxide, neodymium ethoxide, neodymium isopropoxide, neodymium 2-ethylhexoxide, neodymium phenoxide, neodymium nonylphenoxide, and neodymium naphthoxide.

As used herein, the term organolanthanide compound refers to any lanthanide-containing compound containing at least one lanthanide-carbon bond. These compounds are predominantly, though not exclusively, those containing cyclopentadienyl ("Cp"), substituted cyclopentadienyl, allyl, and substituted allyl ligands. Suitable organolanthanide compounds include, but are not limited to, $Cp_3Ln$, $Cp_2LnR$, $Cp_2LnCl$, $CpLnCl_2$, $CpLn(cyclooctatetraene)$, $(C_5Me_5)_2LnR$, $LnR_3$, $Ln(allyl)_3$, and $Ln(allyl)_2Cl$, where Ln represents a lanthanide atom, and R represents a hydrocarbyl group. In one or more embodiments, hydrocarbyl groups useful in the present invention may contain heteroatoms such as, for example, nitrogen, oxygen, boron, silicon, sulfur, and phosphorus atoms.

As mentioned above, the lanthanide-based catalyst systems employed to synthesize trans-1,4-polybutadiene include an alkylating agent. In one or more embodiments, alkylating agents, which may also be referred to as hydrocarbylating agents, include organometallic compounds that can transfer one or more hydrocarbyl groups to another metal. Generally, these agents include organometallic compounds of electropositive metals such as Groups 1, 2, and 3 metals (Groups IA, IIA, and IIIA metals). Specifically excluded from useful alkylating agents are halogen-containing alkylating agents.

In one or more embodiments, alkylating agents useful in the present invention include organomagnesium compounds. As used herein, the term organomagnesium compound refers to any magnesium compound that contains at least one magnesium-carbon bond. In one or more embodiments, organomagnesium compounds that are soluble in a hydrocarbon can be employed. In one or more embodiments, organomagnesium compounds that can be utilized include those represented by the general formula $MgR_2$, where each R independently can be a monovalent organic group that is attached to the magnesium atom via a carbon atom. In one or more embodiments, each R independently can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, silicon, sulfur, and phosphorus atoms.

Suitable organomagnesium compounds that may be represented by the general formula $MgR_2$ include, but are not limited to, diethylmagnesium, di-n-propylmagnesium, diisopropylmagnesium, dibutylmagnesium, dihexylmagnesium, diphenylmagnesium, and dibenzylmagnesium.

Another class of organomagnesium compounds that can be utilized as an alkylating agent may be represented by the general formula RMgX, where R can be a monovalent organic group that is attached to the magnesium atom via a carbon atom, and X can be a hydrogen atom, a carboxylate group, an alkoxide group, or an aryloxide group. In one or more embodiments, R can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. In one embodiment, X can be a carboxylate group, an alkoxide group, or an aryloxide group, with each group containing in the range of from 1 to about 20 carbon atoms.

Types of organomagnesium compounds that may be represented by the general formula RMgX include, but are not limited to, hydrocarbylmagnesium hydride, hydrocarbylmagnesium carboxylate, hydrocarbylmagnesium alkoxide, and hydrocarbylmagnesium aryloxide. As mentioned above, halogen-containing alkylating agents (e.g. halogen-containing organomagnesium compounds), such as hydrocarbylmagnesium halides, are specifically excluded.

Suitable organomagnesium compounds that may be represented by the general formula RMgX include, but are not limited to, methylmagnesium hydride, ethylmagnesium hydride, butylmagnesium hydride, hexylmagnesium hydride, phenylmagnesium hydride, benzylmagnesium hydride, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, and benzylmagnesium phenoxide.

The lanthanide-based catalyst composition used to synthesize trans-1,4-polybutadiene may be formed by combining or mixing the foregoing catalyst ingredients. Although one or more active catalyst species are believed to result from the combination of the lanthanide-based catalyst ingredients, the degree of interaction or reaction between the various catalyst ingredients or components is not known with any great degree of certainty. Therefore, the term "catalyst composition" has been employed to encompass a simple mixture of the ingredients, a complex of the various ingredients that is caused by physical or chemical forces of attraction, a chemical reaction product of the ingredients, or a combination of the foregoing.

The foregoing lanthanide-based catalyst composition may have high catalytic activity for polymerizing 1,3-butadiene into trans-1,4-polybutadiene over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the alkylating agent to the lanthanide-containing compound (alkylating agent/Ln) can be varied from about 1:1 to about 1,000:1, in other embodiments from about 2:1 to about 500:1, and in other embodiments from about 5:1 to about 200:1.

The lanthanide-based catalyst can be prepared by various methods.

In one embodiment, a lanthanide-based catalyst may be formed in situ by adding the individual catalyst ingredients to a solution containing monomer and solvent, or to bulk monomer, in either a stepwise or simultaneous manner. In one embodiment, the alkylating agent can be added first, followed by the lanthanide-containing compound.

In another embodiment, the lanthanide-based catalyst may be preformed. That is, the catalyst ingredients are pre-mixed outside the polymerization system either in the absence of any monomer or in the presence of a small amount of 1,3-butadiene monomer at an appropriate temperature, which may be from about −20° C. to about 80° C. The amount of 1,3-butadiene monomer that may be used for preforming the catalyst can range from about 1 to about 500 moles, in other embodiments from about 5 to about 250 moles, and in other embodiments from about 10 to about 100 moles per mole of the lanthanide-containing compound. The resulting catalyst composition may be aged, if desired, prior to being added to the monomer that is to be polymerized.

In one or more embodiments, a solvent may be employed as a carrier to either dissolve or suspend the lanthanide-based catalyst in order to facilitate the delivery of the lanthanide-based catalyst. In other embodiments, monomer can be used as the carrier. In yet other embodiments, the lanthanide-based catalyst can be used in its neat state without any solvent.

In one or more embodiments, suitable solvents include those organic compounds that will not undergo polymerization or incorporation into propagating polymer chains during the polymerization of monomer in the presence of the lanthanide-based catalyst. In one or more embodiments, these organic species are liquid at ambient temperature and pressure. In one or more embodiments, these organic solvents are inert to the catalyst. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, including hydrocarbon oils that are commonly used to oil-extend polymers. Examples of these oils include paraffinic oils, aromatic oils, naphthenic oils, vegetable oils other than castor oils, and low PCA oils including MES, TDAE, SRAE, heavy naphthenic oils. Since these hydrocarbons are non-volatile, they typically do not require separation and remain incorporated in the polymer.

As mentioned above, the introduction of the catalyst, the 1,3-butadiene monomer, and any solvent, if employed, forms a polymerization mixture in which the trans-1,4-polybutadiene is formed. The amount of the catalyst to be employed may depend on the interplay of various factors such as the type of catalyst employed, the purity of the ingredients, the polymerization temperature, the polymerization rate and conversion desired, the molecular weight desired, and many other factors. Accordingly, a specific catalyst cannot be definitively set forth except to say that catalytically effective amounts of the catalyst may be used.

In one or more embodiments, the amount of the lanthanide-containing compound used can be varied from about 0.001 to about 2 mmol, in other embodiments from about 0.005 to about 1 mmol, and in still other embodiments from about 0.01 to about 0.5 mmol per 100 gram of 1,3-butadiene monomer provided for the synthesis of the trans-1,4-polybutadiene.

In one or more embodiments, the polymerization of 1,3-butadiene into trans-1,4-polybutadiene and/or syndiotactic 1,2-polybutadiene may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst is usually added to the polymerization system. The additional solvent may be the same as or different from the solvent used in preparing the catalyst. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

In other embodiments, the polymerization system employed for polymerizing 1,3-butadiene into trans-1,4-polybutadiene and/or syndiotactic 1,2-polybutadiene may be generally considered a bulk polymerization system that includes substantially no solvent or a minimal amount of solvent. Those skilled in the art will appreciate the benefits of bulk polymerization processes (i.e., processes where monomer acts as the solvent), and therefore the bulk polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In another embodiment, the polymerization mixture contains no solvents other than those that are inherent to the raw materials employed. In still another embodiment, the polymerization mixture is substantially devoid of solvent, which refers to the absence of that amount of solvent that would otherwise have an appreciable impact on the polymerization process. Polymerization mixtures that are substantially devoid of solvent may be referred to as including substantially no solvent. In particular embodiments, the polymerization mixture is devoid of solvent.

As explained above, once a desired conversion of 1,3-butadiene into trans-1,4-polybutadiene is achieved within the polymerization mixture, the polymerization of 1,3-butadiene into syndiotactic 1,2-polybutadiene is performed within the polymerization mixture by introducing an iron-based catalyst to the polymerization mixture. Advantageously, the polymerization of 1,3-butadiene into syndiotactic 1,2-polybutadiene in the presence of the iron-based catalyst can be performed without isolation of the trans-1,4-polybutadiene or purification (e.g. removal of catalyst residues) of the polymerization mixture containing the trans-1,4-polybutadiene. Additionally, the polymerization of the 1,3-butadiene into syndiotactic 1,2-polybutadiene can take place without the addition of any quenching agents for the inactivation of active polymer, catalyst and/or catalyst residues, or without the use of any modifiers that might facilitate transition to a new polymerization system. In one or more embodiments, however, quenching agents may be added the polymerization mixture including the trans-1,4-polybutadiene prior to introducing the iron-based catalyst. Likewise, in one or more embodiments, the polymerization mixture including the trans-1,4-polybutadiene may be purified or manipulated prior to introducing the iron-based catalyst.

The timing of the addition of the iron-based catalyst to the polymerization mixture containing the trans-1,4-polybutadiene may vary depending on a number of factors. For example, the timing may vary depending on the solids content of the polymerization mixture, the processing equipment, and the process design being employed. In one or more embodiments, the iron-based catalyst is added to the polymerization mixture after the conversion of 1,3-butadiene into trans-1,4-polybutadiene reaches at least 5%, in other embodiments at least 10%, in other embodiments at least 20%, in other embodiments at least 50%, and in other embodiments at least 80% based upon the 1,3-butadiene monomer provided for the synthesis of the trans-1,4-polybutadiene. In these or other embodiments, the iron-based catalyst is added to the polymerization mixture before the conversion of 1,3-butadiene into trans-1,4-polybutadiene reaches at most 90%, in other embodiments at most 70%, in other embodiments at most 50%, in other embodiments at most 20%, and in other embodiments at most 15% based on the 1,3-butdiene monomer provided for the synthesis of the trans-1,4-polybutadiene. In particular embodiments, the iron-based catalyst is added to the polymerization mixture after complete conversion of all or substantially all of the 1,3-butadiene monomer provided for the synthesis of the trans-1,4-polybutadiene. The skilled person understands that the complete conversion of all or substantially all of the 1,3-butadiene monomer provided for the synthesis of the trans-1,4-polybutadiene will subsequently require the addition of additional 1,3-butadiene monomer in order to synthesize the syndiotactic 1,2-polybutadiene.

In one or more embodiments, the iron-based catalyst, which may be referred to as the iron-based catalyst system, may include (a) an iron-containing compound, (b) an organomagnesium compound, and (c) a silyl phosphonate. In addition to the three catalyst ingredients (a), (b), and (c), other organometallic compounds or Lewis bases can also be added, if desired.

The iron-based catalyst system can include an iron-containing compound. In one or more embodiments, these iron-containing compounds are soluble in hydrocarbon solvents such as aromatic hydrocarbons, aliphatic hydrocarbons, or cycloaliphatic hydrocarbons. Hydrocarbon-insoluble iron-containing compounds, however, can be suspended in the polymerization medium to form the catalytically active species and are also useful.

The iron atom in the iron-containing compounds can be in various oxidation states including but not limited to the 0, +2, +3, and +4 oxidation states. In particular embodiments, divalent iron compounds (also called ferrous compounds), wherein the iron atom is in the +2 oxidation state, and/or trivalent iron compounds (also called ferric compounds), wherein the iron atom is in the +3 oxidation state, are employed.

Suitable iron-containing compounds include, but are not limited to, iron carboxylates, iron organophosphates, iron organophosphonates, iron organophosphinates, iron carbamates, iron dithiocarbamates, iron xanthates, iron β-diketonates, iron alkoxides or aryloxides, iron halides, iron pseudo-halides, iron oxyhalides, and organoiron compounds.

Suitable iron carboxylates include, but are not limited to, iron(II) formate, iron(III) formate, iron(II) acetate, iron(III) acetate, iron(II) acrylate, iron(III) acrylate, iron(II) methacrylate, iron(III) methacrylate, iron(II) valerate, iron(III) valerate, iron(II) gluconate, iron(III) gluconate, iron(II) citrate, iron(III) citrate, iron(II) fumarate, iron(III) fumarate, iron(II) lactate, iron(III) lactate, iron(II) maleate, iron(III) maleate, iron(II) oxalate, iron(III) oxalate, iron(II) 2-ethylhexanoate, iron(III) 2-ethylhexanoate, iron(II) neodecanoate, iron(III) neodecanoate, iron(II) naphthenate, iron(III) naphthenate, iron(II) stearate, iron(III) stearate, iron(II) oleate, iron(III) oleate, iron(II) benzoate, iron(III) benzoate, iron(II) picolinate, and iron(III) picolinate.

Suitable iron organophosphates include, but are not limited to, iron(II) dibutylphosphate, iron(III) dibutylphosphate, iron(II) dipentylphosphate, iron(III) dipentylphosphate, iron(II) dihexylphosphate, iron(III) dihexylphosphate, iron(II) diheptylphosphate, iron(III) diheptylphosphate, iron(II) dioctylphosphate, iron(III) dioctylphosphate, iron(II) bis(1-methylheptyl)phosphate, iron (III) bis(1-methylheptyl)phosphate, iron(II) bis(2-ethylhexyl)phosphate, iron(III) bis(2-ethylhexyl)phosphate, iron (II) didecylphosphate, iron(III) didecylphosphate, iron(II) didodecylphosphate, iron(III) didodecylphosphate, iron(II) dioctadecylphosphate, iron(III) dioctadecylphosphate, iron (II) dioleylphosphate, iron(III) dioleylphosphate, iron(II) diphenylphosphate, iron(III) diphenylphosphate, iron(II) bis(p-nonylphenyl)phosphate, iron(III) bis(p-nonylphenyl) phosphate, iron(II) butyl(2-ethylhexyl)phosphate, iron(III) butyl(2-ethylhexyl)phosphate, iron (II) (1-methylheptyl)(2-ethylhexyl)phosphate, iron(III) (1-methylheptyl) (2-ethylhexyl)phosphate, iron(II) (2-ethylhexyl)(p-nonylphenyl) phosphate, and iron(III) (2-ethylhexyl)(p-nonylphenyl) phosphate.

Suitable iron organophosphonates include, but are not limited to, iron(II) butyl phosphonate, iron(III) butylphosphonate, iron(II) pentylphosphonate, iron(III) pentylphosphonate, iron(II) hexyl phosphonate, iron(III) hexyl phosphonate, iron(II) heptylphosphonate, iron(III) heptylphosphonate, iron(II) octylphosphonate, iron(III) octylphosphonate, iron(II) (1-methylheptyl)phosphonate, iron(III) (1-methylheptyl)phosphonate, iron(II) (2-ethylhexyl)phosphonate, iron(III) (2-ethylhexyl)phosphonate, iron(II) decylphosphonate, iron(III) decylphosphonate, iron (II) dodecylphosphonate, iron(III) dodecylphosphonate, iron (II) octadecylphosphonate, iron(III) octadecylphosphonate, iron(II) oleylphosphonate, iron(III) oleylphosphonate, iron (II) phenylphosphonate, iron(III) phenylphosphonate, iron (II) (p-nonylphenyl)phosphonate, iron(III) (p-nonylphenyl) phosphonate, iron (II) butylbutylphosphonate, iron(II) butylbutylphosphonate, iron (II) pentylpentylphosphonate, iron (II) pentylpentylphosphonate, iron (II) hexylhexylphosphonate, iron(III) hexylhexylphosphonate, iron (II) heptylheptylphosphonate, iron(III) heptylheptylphosphonate, iron (II) octyloctylphosphonate, iron(III) octyloctylphosphonate, iron(II) (1-methylheptyl)(1-methylheptyl)phosphonate, iron (III) (1-methylheptyl) (1-methylheptyl)phosphonate, iron (II) (2-ethylhexyl) (2-ethylhexyl)phosphonate, iron(III) (2-ethylhexyl) (2-ethylhexyl)phosphonate, iron (II) decyldecylphosphonate, iron (III) decyldecylphosphonate, iron(II) dodecyldodecylphosphonate, iron (III) dodecyldodecylphosphonate, iron(II) octadecyloctadecylphosphonate, iron (III) octadecyloctadecylphosphonate, iron(II) oleyloleylphosphonate, iron(III) oleyl oleylphosphonate, iron(II) phenylphenylphosphonate, iron(III) phenyl phenylphosphonate, iron(II) (p-nonylphenyl)(p-nonylphenyl)phosphonate, iron(III) (p-nonylphenyl) (p-nonylphenyl)phosphonate, iron (II) butyl(2-ethylhexyl)phosphonate, iron(III) butyl(2-ethylhexyl)phosphonate, iron(II) (2-ethylhexyl)butylphosphonate, iron(III) (2-ethylhexyl)butylphosphonate, iron(II) (1-methylheptyl)(2-ethylhexyl)phosphonate, iron(III) (1-methylheptyl)(2-ethylhexyl)phosphonate, iron(II) (2-ethylhexyl)(1-methylheptyl)phosphonate, iron (III) (2-ethylhexyl)(1-methylheptyl)phosphonate, iron(II) (2-ethylhexyl) (p-nonylphenyl)phosphonate, iron(III) (2-ethylhexyl)(p-nonylphenyl)phosphonate, iron(II) (p-nonylphenyl)(2-ethylhexyl)phosphonate, and iron(III) (p-nonylphenyl)(2-ethylhexyl)phosphonate.

Suitable iron organophosphinates include, but are not limited to, iron(II) butylphosphinate, iron(III) butylphosphinate, iron(II) pentylphosphinate, iron(III) pentylphosphinate, iron(II) hexylphosphinate, iron(III) hexylphosphinate, iron(II) heptylphosphinate, iron(III) heptylphosphinate, iron (II) octylphosphinate, iron(III) octylphosphinate, iron (II) (1-methylheptyl)phosphinate, iron(III) (1-methylheptyl) phosphinate, iron (II) (2-ethylhexyl)phosphinate, iron(III) (2-ethylhexyl)phosphinate, iron(II) decylphosphinate, iron (III) decylphosphinate, iron(II) dodecylphosphinate, iron (III) dodecylphosphinate, iron(II) octadecylphosphinate, iron(III) octadecylphosphinate, iron(II) oleylphosphinate, iron(III) oleylphosphinate, iron(II) phenylphosphinate, iron (III) phenylphosphinate, iron(II) (p-nonylphenyl)phosphinate, iron (III) (p-nonylphenyl)phosphinate, iron (II) dibutylphosphinate, iron(III) dibutylphosphinate, iron(II) dipentylphosphinate, iron(III) dipentylphosphinate, iron(II) dihexylphosphinate, iron(III) dihexylphosphinate, iron(II) diheptylphosphinate, iron(III) diheptylphosphinate, iron(II) dioctylphosphinate, iron(III) dioctylphosphinate, iron(II) bis(1-methylheptyl)phosphinate, iron (III) bis(1-methylheptyl) phosphinate, iron(II) bis(2-ethyihexyl)phosphinate, iron(III) bis(2-ethylhexyl)phosphinate, iron(II) didecylphosphinate, iron(III) didecylphosphinate, iron(II) didodecylphosphinate, iron(III) didodecylphosphinate, iron(II) dioctadecylphosphinate, iron(III) dioctadecylphosphinate, iron(II) dioleylphosphinate, iron(III) dioleylphosphinate, iron (II) diphenylphosphinate, iron (III) diphenyophosphinate, iron(II) bis(p-nonylphenyl)phosphinate, iron(III) bis(p-nonylphenyl)

phosphinate, iron(II) butyl(2-ethylhexyl)phosphinate, iron (III) butyl(2-ethylhexyl)phosphinate, iron(II) (1-methylheptyl)(2-ethylhexyl)phosphinate, iron(III) (1-methylheptyl)(2-ethylhexyl)phosphinate, iron(II) (2-ethylhexyl)(p-nonylphenyl)phosphinate, and iron(III) (2-ethylhexyl) (p-nonylphenyl)phosphinate.

Suitable iron carbamates include, but are not limited to, iron(II) dimethylcarbamate, iron(III) dimethylcarbamate, iron(II) diethylcarbamate, iron(III) diethylcarbamate, iron (II) diisopropylcarbamate, iron(III) diisopropylcarbamate, iron(II) dibutylcarbamate, iron(III) dibutylcarbamate, iron (II) dibenzylcarbamate, and iron(III) dibenzylcarbamate.

Suitable iron dithiocarbamates include, but are not limited to, iron(II) dimethyldithiocarbamate, iron(III) dimethyldithiocarbamate, iron(II) diethyldithiocarbamate, iron(III) diethyldithiocarbamate, iron(II) diisopropyldithiocarbamate, iron (III) diisopropyldithiocarbamate, iron(II) dibutyldithiocarbamate, iron (III) dibutyldithiocarbamate, iron (II) dibenzyldithiocarbamate, and iron(III) dibenzyldithiocarbamate.

Suitable iron xanthates include, but are not limited to, iron(II) methylxanthate, iron(III) methylxanthate, iron(II) ethylxanthate, iron(III) ethylxanthate, iron(II) isopropylxanthate, iron(III) isopropylxanthate, iron(II) butylxanthate, iron(III) butylxanthate, iron(II) benzylxanthate, and iron(III) benzylxanthate.

Suitable iron β-diketonates include, but are not limited to, iron(II) acetylacetonate, iron(III) acetylacetonate, iron(II) trifluoroacetylacetonate, iron(III) trifluoroacetylacetonate, iron (II) hexafluoroacetylacetonate, iron (III) hexafluoroacetylacetonate, iron(II) benzoylacetonate, iron(III) benzoylacetonate, iron(II) 2,2,6,6-tetramethyl-3,5-heptanedionate, and iron(III) 2,2,6,6-tetramethyl-3,5-heptanedionate.

Suitable iron alkoxides or aryloxides include, but are not limited to, iron(II) methoxide, iron(III) methoxide, iron(II) ethoxide, iron(III) ethoxide, iron(II) isopropoxide, iron(III) isopropoxide, iron(II) 2-ethylhexoxide, iron(III) 2-ethylhexoxide, iron(II) phenoxide, iron(III) phenoxide, iron(II) nonylphenoxide, iron(III) nonylphenoxide, iron(II) naphthoxide, and iron(III) naphthoxide.

As used herein, the term organoiron compound refers to any iron compound containing at least one covalent iron-carbon bond. Suitable organoiron compounds include bis (cyclopentadienyl) iron(II) (also called ferrocene), bis(pentamethylcyclopentadienyl) iron(II) (also called decamethylferrocene), bis(pentadienyl) iron (II), bis(2,4-dimethylpentadienyl) iron(II), bis(allyl)dicarbonyliron(II), (cyclopentadienyl) (pentadienyl) iron (II), tetra(1-norbornyl) iron(IV), (trimethylenemethane)tricarbonyliron(II), bis (butadiene) carbonyliron 0), butadienetricarbonyliron(0), and bis(cyclooctatetraene)iron(0).

Suitable iron halides include, but are not limited to, iron(II) fluoride, iron(III) fluoride, iron(II) chloride, iron(III) chloride, iron(II) bromide, iron(III) bromide, and iron(II) iodide. Some representative examples of suitable iron pseudo-halides include iron(II) cyanide, iron(III) cyanide, iron(II) cyanate, iron(III) cyanate, iron(II) thiocyanate, iron (III) thiocyanate, iron(II) azide, iron(III) azide, and iron(III) ferrocyanide (also called Prussian blue). Some representative examples of suitable iron oxyhalides include iron(III) oxychloride and iron(III) oxybromide.

As mentioned above, the iron-based catalyst system can include an organomagnesium compound. Suitable organomagnesium compounds for use in the iron-based catalyst systems are described above with respect to the lanthanide-based catalyst system. In certain embodiments, an identical organomagnesium compound is included in both the iron-based catalyst system and lanthanide-based catalyst system. In some embodiments, the organomagnesium compound employed to form the lanthanide-based catalyst is sufficient for the preparation of the iron-based catalyst that is used for the polymerization of 1,3-butadiene into syndiotactic 1,2-polybutadiene, and therefore additional organomagnesium compound need not be introduced for purposes of the iron-based catalyst system. In some embodiments, additional organomagnesium compound may be added for purposes of the iron-based catalyst system. In other embodiments, a different organomagnesium compound is included in the iron-based catalyst than the organomagnesium compound included in the lanthanide-based catalyst.

As mentioned above, the iron-based catalyst system can include a silyl phosphonate compound. In one or more embodiments, silyl phosphonate compounds that can be used in the iron-based catalyst system include acyclic silyl phosphonates, cyclic silyl phosphonates, and mixtures thereof. In one or more embodiments, acyclic silyl phosphonates may be represented by the following structure:

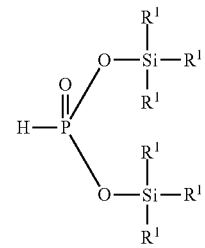

where each $R^1$ is independently a hydrogen atom or a mono-valent organic group. In one or more embodiments, the acyclic silyl phosphonates may be associated in dimeric, trimeric or oligomeric forms by hydrogen bonding.

Suitable acyclic silyl phosphonates include, but are not limited to, bis(trimethylsilyl)phosphonate, bis(dimethylsilyl)phosphonate, bis(triethylsilyl)phosphonate, bis(diethylsilyl)phosphonate, bis(tri-n-propylsilyl)phosphonate, bis(di-n-propylsilyl)phosphonate, bis(triisopropylsilyl) phosphonate, bis(diisopropylsilyl)phosphonate, bis(tri-n-butylsilyl)phosphonate, bis(di-n-butylsilyl)phosphonate, bis (triisobutylsilyl)phosphonate, bis(diisobutylsilyl) phosphonate, bis(tri-t-butylsilyl)phosphonate, bis(di-t-hutylsilyl)phosphonate, bis(trihexylsilyl)phosphonate, bis (dihexylsilyl)phosphonate, bis(trioctylsilyl)phosphonate, bis(dioctylsilyl)phosphonate, bis(tricyclohexylsilyl)phosphonate, bis(dicyclohexylsilyl)phosphonate, bis(triphenylsilyl)phosphonate, bis(diphenylsilyl)phosphonate, bis(tri-p-tolylsilyl)phosphonate, bis(di-p-tolylsilyl)phosphonate, bis (tribenzylsilyl)phosphonate, bis(dibenzylsilyl)phosphonate, bis(methyl diethylsilyl)phosphonate, bis(methyldi-n-propylsilyl)phosphonate, bis(methyl dusopropylsilyl)phosphonate, bis(methyl di-n-butylsilyl)phosphonate, bis(methyidisobutylsilyl)phosphonate, bis(methyl di-t-butylsilyl)phosphonate, bis(methyldiphenylsilyl)phosphonate, bis(dimethylethylsilyl)phosphonate, bis(dimethyl-n-propylsilyl) phosphonate, bis(dimethylisopropylsilyl)phosphonate, bis (dimethyl-n-butylsilyl)phosphonate, bis (dimethylisobutylsilyl)phosphonate, bis(dimethyl-t-butylsilyl)phosphonate, bis(dimethylphenylsilyl) phosphonate, bis(t-butyldiphenylsilyl)phosphonate, bis[tris (2-ethylhexyl) silyl]phosphonate, bis[bis(2-ethylhexyl) silyl]phosphonate, bis[tris(nonyiphenyl)silyl]phosphonate, bis[tris(2,4,6-trimethylphenyl) silyl]phosphonate, bis[bis(2, 4,6-trimethylphenyl)silyl]phosphonate, bis[tris(4-fluorophenyl) silyl]phosphonate, bis[bis(4-fluorophenyl)silyl]phosphonate, bis[tris(pentafluorophenyl) silyl]phosphonate, bis[tris(trifluoromethyOsilyl]phosphonate, bis[tris(2,2,2-trifluoroethyl) silyl]phosphonate, bis[tris(trimethylsilyl) silyl]phosphonate, bis[tris(trimethylsilylmethyl) silyl]phosphonate, bis[tris(dimethylsilyl) silyl]phosphonate, bis[tris(2-hutoxyethyl) silyl]phosphonate, bis(trimethoxysilyl)phosphonate, bis(triethoxysilyl)phosphonate, bis(triphenoxysilyl)phosphonate, bis[tris(trimethylsilyloxy)silyl]phosphonate, bis[tris(dimethylsilyloxy) silyl]phosphonate, or mixtures thereof.

In one or more embodiments, cyclic silyl phosphonates contain a ring structure that is formed by joining two silicon atoms together or by bridging the two silicon atoms with one or more divalent organic groups. In one or more embodiments, these cyclic silyl phosphonates may be represented by the following structure:

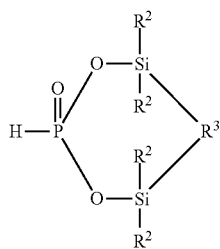

where each $R^2$ is independently a hydrogen atom or a mono-valent organic group, and $R^3$ is a bond or a divalent organic group. Bicyclic silyl phosphonates may be formed by joining two $R^2$ groups, and therefore the term cyclic silyl phosphonate will include multi-cyclic silyl phosphonates. The cyclic silyl phosphonates may be associated in dimeric, trimeric or oligomeric forms by hydrogen bonding.

Suitable cyclic silyl phosphonates include but are not limited to, 2-oxo-(2H)-4,5-disila-1,3,2-dioxaphospholane, 2-oxo-(2H)-4,5-disila-4,4,5,5-tetramethyl-1,3,2-dioxaphospholane, 2-oxo-(2H)-4,5-disila-4,4,5,5-tetraethyl-1,3,2-dioxaphospholane, 2-oxo-(2H)-4,5-disila-4,4,5,5-tetraphenyl-1,3,2-dioxaphospholane, 2-oxo-(2H)-4,5-disila-4,4,5,5-tetrabenzyl-1,3,2-dioxaphospholane, 2-oxo-(2H)-4,5-disila-4,5-dimethyl-1,3,2-dioxaphospholane, 2-oxo-(2H)-4,5-disila-4,5-diethyl-1,3,2-dioxaphospholane, 2-oxo-(2H)-4,5-disila-4,5-diphenyl-1,3,2-dioxaphospholane, 2-oxo-(2H)-4,5-disila-4,5-dibenzyl-1,3,2-dioxaphospholane, 2-oxo-(2H)-4,5-disila-4-methyl-1,3,2-dioxaphospholane, 2-oxo-(2H)-4,6-disila-1,3,2-dioxaphosphorinane, 2-oxo-(2H)-4,6-disila-4,4,6,6-tetramethyl-1,3,2-dioxaphosphorinane, 2-oxo-(2H)-4,6-disila-4,4,6,6-tetraethyl-1,3,2-dioxaphosphorinane, 2-oxo-(2H)-4,6-disila-4,4,6,6-tetraphenyl-1,3,2-dioxaphosphorinane, 2-oxo-(2H)-4,6-disila-4,4,6,6-tetrabenzyl-1,3,2-dioxaphosphorinane, 2-oxo-(2H)-4,6-disila-4,6-dimethyl-1,3,2-dioxaphosphorinane, 2-oxo-(2H)-4,6-disila-4,6-diethyl-1,3,2-dioxaphosphorinane, 2-oxo-(2H)-4,6-disila-4,6-diphenyl-1,3,2-dioxaphosphorinane, 2-oxo-(2H)-4,6-disila-4,6-dibenzyl-1,3,2-dioxaphosphorinane, 2-oxo-(2H)-4,6-disila-5,5-dimethyl-1,3,2-dioxaphosphorinane, 2-oxo-(2H)-4,6-disila-5,5-diethyl-1,3,2-dioxaphosphorinane, 2-oxo-(2H)-4,6-disila-5,5-diphenyl-1,3,2-dioxaphosphorinane, 2-oxo-(2H)-4,6-disila-5,5-dibenzyl-1,3,2-dioxaphosphorinane, 2-oxo-(2H)-4,6-disila-5-ethyl-5-methyl-,3,2-dioxaphosphorinane, 2-oxo-(2H)-4,6-disila-5-methyl-5-propyl-1,3,2-dioxaphosphorinane, 2-oxo-(2H)-4, 6-disila-5-butyl-5-ethyl-1,3,2-dioxaphosphorinane, 2-oxo-(2H)-4,6-disila-4-isopropyl-5,5-dimethyl-1,3,2-dioxaphosphorinane, 2-oxo-(2H)-4,6-disila-4-propyl-5-ethyl-1,3,2-dioxaphosphorinane, 2-oxo-(2H)-4,6-disila-4-methyl-1,3,2-dioxaphosphorinane, or mixtures thereof.

The iron-based catalyst composition that is used to synthesize syndiotactic 1,2-polybutadiene may be formed by combining or mixing the foregoing catalyst ingredients. Although one or more active catalyst species are believed to result from the combination of the iron-based catalyst ingredients, the degree of interaction or reaction between the various catalyst ingredients or components is not known with any great degree of certainty. As with the lanthanide-based catalyst, the term "catalyst composition" has been employed to encompass a simple mixture of the ingredients, a complex of the various ingredients that is caused by physical or chemical forces of attraction, a chemical reaction product of the ingredients, or a combination of the foregoing.

The foregoing iron-based catalyst composition has a very high catalytic activity for polymerizing 1,3-butadiene into syndiotactic 1,2-polybutadiene over a wide range of catalyst concentrations and catalyst ingredient ratios. The polymers having the most desirable properties, however, are obtained within a narrower range of catalyst concentrations and catalyst ingredient ratios. Further, it is believed that the catalyst ingredients may interact to form an active catalyst species. Accordingly, the optimum concentration for any one catalyst ingredient is dependent upon the concentrations of the other catalyst ingredients.

In one or more embodiments, the molar ratio of the organomagnesium compound to the iron-containing compound (Mg/Fe) can be varied from about 1:1 to about 50:1, in other embodiments from about 2:1 to about 30:1, and in other embodiments from about 3:1 to about 20:1.

In one or more embodiments, the molar ratio of the silyl phosphonate to the iron-containing compound (P/Fe) can be varied from about 0.5:1 to about 50:1, in other embodiments from about 1:1 to about 25:1, and in other embodiments from about 2:1 to about 10:1.

The iron-based catalyst can be formed by various methods.

In one embodiment, the iron-based catalyst may be formed in situ by adding the individual catalyst ingredients to the polymerization mixture including trans-1,4-polybutadiene in either a stepwise or simultaneous manner. In particular embodiments, the iron-containing compound is added first, followed by the organomagnesium compound, and then followed by the silyl phosphonate.

In another embodiment, the iron-based catalyst may be preformed. That is, the individual catalyst ingredients are pre-mixed outside the polymerization mixture including the trans-1,4-polybutadiene either in the absence of any monomer or in the presence of a small amount of 1,3-butadiene monomer at an appropriate temperature, which may be from about −20° C. to about 80° C. The amount of 1,3-butadiene monomer that may be used for preforming the catalyst can range from about 1 to about 500 moles, in other embodiments from about 5 to about 250 moles, and in other embodiments from about 10 to about 100 moles per mole of the iron-containing compound. The resulting preformed catalyst may be aged, if desired, prior to being added to the polymerization mixture including the trans-1,4-polybutadiene.

In yet another embodiment, the iron-based catalyst may be formed by using a two-stage procedure. The first stage involves combining the iron-containing compound with the organomagnesium compound either in the absence of any monomer or in the presence of a small amount of 1,3-butadiene monomer at an appropriate temperature, which may be from about −20° C. to about 80° C. The amount of monomer employed in the first stage may be similar to that set forth above for preforming the catalyst. In the second stage, the foregoing reaction mixture and the silyl phosphonate are charged in either a stepwise or simultaneous manner to the polymerization mixture including the trans-1,4-polybutadiene.

In still another embodiment, the iron-based catalyst may also be formed by using an alternative two-stage procedure. In the first stage, an iron-ligand complex is formed by pre-combining the iron-containing compound with the silyl phosphonate. The complexation reaction between the iron-containing compound and the silyl phosphonate to form the iron-ligand complex can be conducted at any convenient temperature at normal pressure, but for an increased rate of reaction, it may be convenient to perform this reaction at room temperature or above. The time required for the formation of the iron-ligand complex is usually within the range of about 10 minutes to about 2 hours after mixing the iron-containing compound with the silyl phosphonate. The temperature and time used for the formation of the iron-ligand complex will depend upon several variables including the particular starting materials and the solvent employed. Once formed, the iron-ligand complex can be used without isolation from the complexation reaction mixture. If desired, however, the iron-ligand complex may be isolated from the complexation reaction mixture before use. In the second stage, the iron-ligand complex and the organomagnesium compound can be charged in either a stepwise or simultaneous manner to the polymerization mixture including the trans-1,4-polybutadiene In one or more embodiments, additional 1,3-butadiene monomer and optionally additional solvent may be introduced to the polymerization mixture including trans-1,4-polybutadiene. In certain embodiments, the additional 1,3-butadiene monomer and optionally additional solvent may be introduced to the polymerization mixture prior to introduction of the iron-based catalyst or any component thereof. In other embodiments, the additional 1,3-butadiene monomer and optionally additional solvent may be introduced to the polymerization mixture after introduction of the iron-based catalyst. In other embodiments, the additional 1,3-butadiene monomer and optionally additional solvent may be introduced to the polymerization mixture simultaneously with the iron-based catalyst or any component thereof. In these or other embodiments, the additional 1,3-butadiene monomer and optionally additional solvent may be introduced prior to, during, and after introduction of the iron-based catalyst. The additional solvent may be the same as or different from the solvent, if any, that is employed in preparing the polymerization mixture including the trans-1,4-polybutadiene. Exemplary solvents have been set forth above.

Several factors can impact the amount of 1,3-butadiene, if any, added to the polymerization mixture including the trans-1,4-polybutadiene. For example, the amount may depend on the amount of 1,3-butadiene remaining after formation of the desired amount of trans-1,4-polybutadiene. In other embodiments, the amount may depend on the desired composition of the final product; i.e. the amount of the trans-1,4-polybutadiene relative to that of the syndiotactic 1,2-polybutadiene within the blend of the trans-1,4-polybutadiene and the syndiotactic 1,2-polybutadiene. In some embodiments, the amount of 1,3-butadiene remaining after the formation of the desired amount of trans-1,4-polybutadiene is sufficient for the formation of syndiotactic 1,2-polybutadiene, and therefore additional 1,3-butadiene need not be introduced.

In one or more embodiments, the total amount of the 1,3-butadiene provided for the synthesis of syndiotactic 1,2-polybutadiene within the polymerization mixture containing the trans-1,4-polybutaidene may be from about 10 to about 1000 gram, in other embodiments from about 20 to about 500 gram, and in still other embodiments from about 50 to about 200 gram per 100 gram of the trans-1,4-polybutadiene within the polymerization mixture.

In one or more embodiments, the amount of the iron-containing compound used for polymerizing 1,3-butadiene into syndiotactic 1,2-polybutadiene can be varied from about 0.01 to about 2 mmol, in other embodiments from about 0.05 to about 1.0 mmol, and in still other embodiments from about 0.1 to about 0.5 mmol per 100 gram of the total 1,3-butadiene monomer provided for the synthesis of syndiotactic 1,2-polybutadiene.

The process of this invention may be conducted in any conventional polymerization vessels known in the art. In one or more embodiments, such as where the polymerization mixture includes sufficient solvent to conduct a solution polymerization, the process may be conducted in a conventional stirred-tank reactor. In other embodiments, such as where the amount of solvent is limited and a bulk polymerization is conducted, the process can be conducted in a conventional stirred-tank reactor, especially if the monomer conversion is less than about 60%. In still other embodiments, especially where the monomer conversion in a bulk polymerization process is higher than about 60%, which typically results in a highly viscous cement, the process may be conducted in an elongated reactor in which the viscous cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Pat. No. 7,351,776, which is incorporated herein by reference.

The process of this invention can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 150° C., in other embodiments from about 0° C. to about 130° C., and in other embodiments from about 20° C. to about 110° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, the polymerization conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

In one or more embodiments, both the formation of the trans-1,4-polybutadiene and the formation of the syndiotactic 1,2-polybutadiene take place within a single vessel (e.g., a conventional stirred-tank reactor). In these or other embodiments, the respective catalyst compositions (i.e. the lanthanide-based catalyst and the iron-based catalyst) can be formed within this single vessel (i.e. in situ formation of the catalysts) or one or both of the catalyst compositions may be pre-formed or partially pre-formed in one or more separate vessels and then transferred to the vessel where the polymerization of monomer (or at least a major portion thereof) may be conducted.

In yet other embodiments, the formation of the trans-1,4-polybutadiene and the formation of the syndiotactic 1,2-polybutadiene are conducted in different reaction vessels (e.g. different conventional stirred-tank reactors). For example, the trans-1,4-polybutadiene may be prepared in a first vessel, and then the polymerization mixture including the trans-1,4-polybutadiene may be transferred to a second vessel where the iron-based catalyst introduced to the polymerization mixture and syndiotactic 1,2-polybutadiene is prepared. As indicated above, the synthesis of the syndiotactic 1,2-polybutadiene may take place without quenching, purifying, or otherwise manipulating the polymerization mixture containing the trans-1,4-polybutadiene even though more than one vessel may be employed.

In particular embodiments, the process of this invention is a continuous process where the synthesis of the trans-1,4-polybutadiene and the synthesis of the syndiotactic 1,2-polybutadiene occur within a distinct zone of the process. For example, the polymerization of 1,3-butadiene into trans-1,4-polybutadiene (or at least a portion thereof) occurs within a zone of the process (e.g., a reactor), which zone may be referred to as a first zone. After a desired monomer conversion, the polymerization mixture is removed from the first zone and introduced to a subsequent zone (e.g., a downstream reactor), which may be referred to as a second zone, where the iron-based catalyst can be introduced to the polymerization mixture and syndiotactic 1,2-polybutadiene is synthesized. In particular embodiments, especially where bulk polymerization is conducted, the polymerization mixture is removed from the first zone prior to complete monomer conversion (e.g., prior to 50% conversion), and the iron-based catalyst is added to the polymerization mixture in the second zone. As indicated above, the synthesis of the syndiotactic 1,2-polybutadiene may take place without quenching, purifying, or otherwise manipulating the polymerization mixture containing the trans-1,4-polybutadiene even though more than one zone of a reactor may be employed.

In one or more embodiments, after the iron-based catalyst is added to the polymerization mixture and a desired degree of polymerization has been accomplished or completed, a quenching agent can be added to the polymerization mixture in order inactivate any residual reactive polymer chains, and/or inactivate the catalyst, catalyst components and/or catalyst residues. The quenching agent may include a protic compound, which includes, but is not limited to, an alcohol, a carboxylic acid, an inorganic acid, water, or a mixture thereof. An antioxidant such as 2,6-di-tert-butyl-4-methylphenol may be added along with, before, or after the addition of the quenching agent. The amount of the antioxidant employed may be in the range of 0.2% to 1% by weight of the polymer product. Additionally, the polymer product can be oil extended by adding an oil to the polymer, which may be in the form of a polymer cement or polymer dissolved or suspended in monomer. Practice of the present invention does not limit the amount of oil that may be added, and therefore conventional amounts may be added (e.g., 5-50 phr). Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

Once the polymerization mixture has been quenched, the various constituents of the polymerization mixture may be recovered. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The blend of trans-1,4-polybutadiene and syndiotactic 1,2-polybutadiene may be recovered from the polymerization mixture by using techniques known in the art. In one or more embodiments, desolventization and drying techniques may be used. For instance, the blend of trans-1,4-polybutadiene and syndiotactic 1,2-polybutadiene can be recovered by passing the polymerization mixture through a heated screw apparatus, such as a desolventizing extruder, in which the volatile substances are removed by evaporation at appropriate temperatures (e.g., about 100° C. to about 170° C.) and under atmospheric or sub-atmospheric pressure. This treatment serves to remove unreacted monomer as well as any low-boiling solvent. Alternatively, the blend of trans-1,4-polybutadiene and syndiotactic 1,2-polybutadiene can also be recovered by subjecting the polymerization mixture to steam desolventization, followed by drying the resulting polymer crumbs in a hot air tunnel. The blend of trans-1,4-polybutadiene and syndiotactic 1,2-polybutadiene can also be recovered by directly drying the polymerization mixture on a drum dryer.

In one or more embodiments, the blend of trans-1,4-polybutadiene and syndiotactic 1,2-polybutadiene may include from about 10 to about 90 percent, in other embodiments from about 30 to about 70 percent, and in other embodiments from about 40 to about 60 percent trans-1,4-polybutadiene based on the entire weight of the blend (i.e., the weight of the trans-1,4-polybutadiene and syndiotactic 1,2-polybutadiene combined).

In one or more embodiments, the blend of trans-1,4-polybutadiene and syndiotactic 1,2-polybutadiene may have multiple melting points. In one or more embodiments, the blend of trans-1,4-polybutadiene and syndiotactic 1,2-polybutadiene may have two melting temperatures In one or more embodiments, the blend of trans-1,4-polybutadiene and syndiotactic 1,2-polybutadiene may have three melting temperatures.

In one or more embodiments, the blend of trans-1,4-polybutadiene and syndiotactic 1,2-polybutadiene may have a first melting temperature of from 40° C. to 70° C. In these or other embodiments, the blend of trans-1,4-polybutadiene and syndiotactic 1,2-polybutadiene may have a second melting temperature of from 70° C. to 120° C. In these or other embodiments, the blend of trans-1,4-polybutadiene and syndiotactic 1,2-polybutadiene may have a third melting temperature of from 120° C. to 190° C.

In one or more embodiments, the blend of trans-1,4-polybutadiene and syndiotactic 1,2-polybutadiene may be used in preparing rubber compositions that can be used to manufacture tire components. Rubber compounding techniques and the additives employed therein are generally disclosed in *The Compounding and Vulcanization of Rubber*, in *Rubber Technology* (2$^{nd}$ Ed. 1973).

The rubber compositions can be prepared by using the blend of trans-1,4-polybutadiene and syndiotactic 1,2-polybutadiene alone or together with other elastomers (i.e., polymers that can be vulcanized to form compositions possessing rubbery or elastomeric properties). Other elastomers that may be used include natural and synthetic rubbers. The synthetic rubbers typically derive from the polymerization of conjugated diene monomer, the copolymerization of conjugated diene monomer with other monomer such as vinyl-substituted aromatic monomer, or the copolymerization of ethylene with one or more α-olefins and optionally one or more diene monomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures.

The rubber compositions may include fillers such as inorganic and organic fillers. Examples of organic fillers include carbon black and starch. Examples of inorganic fillers include silica, aluminum hydroxide, magnesium hydroxide, mica, talc (hydrated magnesium silicate), and clays (hydrated aluminum silicates). Carbon blacks and silicas are the most common fillers used in manufacturing tires. In certain embodiments, a mixture of different fillers may be advantageously employed.

In one or more embodiments, carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of at least 20 m$^2$/g and in other embodiments at least 35 m$^2$/g; surface area values can be determined by ASTM D-1765 using the cetyltrimethylammonium bromide (CTAS) technique. The carbon blacks may be in a pelletized form or an unpelletized flocculent form. The preferred form of carbon black may depend upon the type of mixing equipment used to mix the rubber compound.

The amount of carbon black employed in the rubber compositions can be up to about 50 parts by weight per 100 parts by weight of rubber (phr), with about 5 to about 40 phr being typical.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J.M. Huber Corp. (Edison, N.J.).

In one or more embodiments, silicas may be characterized by their surface areas, which give a measure of their reinforcing character. The Brunauer, Emmet and Teller ("BET") method (described in *J. Am. Chem. Soc.*, vol. 60, p. 309 et seq.) is a recognized method for determining the BET surface area. The BET surface area of silica is generally less than 450 m$^2$/g. Useful ranges of surface area include from about 32 to about 400 m$^2$/g, about 100 to about 250 m$^2$/g, and about 150 to about 220 m$^2$/g.

The pH's of the silicas are generally from about 5 to about 7 or slightly over 7, or in other embodiments from about 5.5 to about 6.8.

In one or more embodiments, where silica is employed as a filler (alone or in combination with other fillers), a coupling agent and/or a shielding agent may be added to the rubber compositions during mixing in order to enhance the interaction of silica with the elastomers. Useful coupling agents and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference.

The amount of silica employed in the rubber compositions can be from about 1 to about 100 phr or in other embodiments from about 5 to about 80 phr. The useful upper range is limited by the high viscosity imparted by silicas. When silica is used together with carbon black, the amount of silica can be decreased to as low as about 1 phr; as the amount of silica is decreased, lesser amounts of coupling agents and shielding agents can be employed. Generally, the amounts of coupling agents and shielding agents range from about 4% to about 20% based on the weight of silica used.

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, (3$^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, (2$^{nd}$ Ed. 1989), which are incorporated herein by reference. Vulcanizing agents may be used alone or in combination.

Other ingredients that are typically employed in rubber compounding may also be added to the rubber compositions. These include accelerators, accelerator activators, oils, plasticizer, waxes, scorch inhibiting agents, processing aids, zinc oxide, tackifying resins, reinforcing resins, fatty acids such as stearic acid, peptizers, and antidegradants such as antioxidants and antiozonants. In particular embodiments, the oils that are employed include those conventionally used as extender oils, which are described above.

All ingredients of the rubber compositions can be mixed with standard mixing equipment such as Banbury or Brabender mixers, extruders, kneaders, and two-rolled mills. In one or more embodiments, the ingredients are mixed in two or more stages. In the first stage (often referred to as the masterbatch mixing stage), a so-called masterbatch, which typically includes the rubber component and filler, is prepared. To prevent premature vulcanization (also known as scorch), the masterbatch may exclude vulcanizing agents. The masterbatch may be mixed at a starting temperature of from about 25° C. to about 125° C. with a discharge temperature of about 135° C. to about 180° C. Once the masterbatch is prepared, the vulcanizing agents may be introduced and mixed into the masterbatch in a final mixing stage, which is typically conducted at relatively low temperatures so as to reduce the chances of premature vulcanization. Optionally, additional mixing stages, sometimes called remills, can be employed between the masterbatch mixing stage and the final mixing stage. One or more remill stages are often employed where the rubber composition includes silica as the filler.

The mixing procedures and conditions particularly applicable to silica-filled tire formulations are described in U.S. Pat. Nos. 5,227,425, 5,719,207, and 5,717,022, as well as European Patent No. 890,606, all of which are incorporated herein by reference.

The rubber compositions prepared from the blend of trans-1,4-polybutadiene and syndiotactic 1,2-polybutadiene are particularly useful for forming tire components such as treads, subtreads, sidewalls, body ply skims, bead filler, and the like. In particular embodiments, the blend of trans-1,4-polybutadiene and syndiotactic 1,2-polybutadiene are employed in tread and sidewall formulations. In one or more embodiments, these tread or sidewall formulations may include from about 1% to about 20% by weight, in other embodiments from about 2% to about 15% by weight, and in other embodiments from about 5% to about 10% by weight of the blend of trans-1,4-polybutadiene and syndiotactic 1,2-polybutadiene based on the total weight of the rubber within the formulation.

Where the rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. Pneumatic tires can be made as discussed in U.S. Pat. Nos. 5,866,171, 5,876,527, 5,931,211, and 5,971,046, which are incorporated herein by reference.

In one or more embodiments, the blend of trans-1,4-polybutadiene and syndiotactic 1,2-polybutadiene may be used in preparing rubber compositions that can be used in the manufacture of air sleeves, also known as bellows, of air suspension systems. Air suspension systems may include an air spring and a pump for delivering air pressure to the air spring. The air springs may include the air sleeve, a piston, a bead plate, and fittings. The air sleeve may include a rubber laminate including multiple rubber sheets laminated to one another. In one or more embodiments, one or more of the rubber sheets may include reinforcing cords, such as fiber cords. In particular embodiments, the laminate includes two layers of fiber-reinforced rubber sheet, with the fibers of the individual layers being positioned at a bias with respect to each other; i.e., the fibers of the first layer are positions at a bias to the fibers of the second layer, where the fibers of the individual layers are positioned parallel to one another within the layer. Other layers of the laminate may include a liner, which the fiber-reinforced layers may overlay. Still other layers may include a cover, which may overlay the fiber-reinforced layer or layers.

In one or more embodiments, the rubber compositions, which may also be referred to as vulcanizable compositions, are useful in the manufacture of one or more layers of an airsleeve. These vulcanizable compositions include a vulcanizable rubber, non-ionic surfactant, and optionally other ingredients known to be included in rubber compositions for preparing one or more layers of an airsleeve. These rubber compositions may be fabricated and cured into airsleeves and ultimately assembled into air springs by employing techniques known in the art. In particular embodiments, the rubber compositions described herein are employed in the manufacture of the liner layer of an air sleeve. In other embodiments, the rubber compositions described herein are employed in the manufacture of a cover layer of an air sleeve. In other embodiments, both the liner and the cover are manufactured from the rubber compositions of the present invention. In yet other embodiments, the rubber compositions of the present invention are employed in the manufacture of the fiber-reinforced layer or layers. In yet other embodiments, the liner, the cover, and the fiber-reinforced layers are manufactured from the rubber compositions of the present invention.

In order to demonstrate the practice of the present invention, the following examples have been prepared and tested. The examples should not, however, be viewed as limiting the scope of the invention. The claims will serve to define the invention.

EXAMPLES

Example 1

Synthesis of Trans-1,4-Polybutadiene

An oven-dried 800-mL glass bottle was capped with a self-sealing rubber liner and a perforated metal cap. After the bottle was thoroughly purged with a stream of dry nitrogen, the bottle was charged with 98 g of hexanes, 235 g of a 1,3-butadiene/hexanes blend containing 21.3% by weight of 1,3-butadiene, 0.075 mmol of lanthanum(III) bis(2-ethylhexyl) phosphate and 0.30 mmol of dibutylmagnesium. The bottle was tumbled for 135 minutes in a water bath maintained at 65° C. to give a cement of trans-1,4-polybutadiene. The polymer cement was treated with 3 ml of 12 wt % 2,6-di-tert-butyl-4-methylphenol solution in isopropanol and then coagulated with 2 liters of isopropanol containing 1.5 g of 2,6-di-t-butyl-4-(dimethylaminomethyl)phenol. The resulting trans-1,4-polybutadiene was isolated by filtration and dried to a constant weight under vacuum at 60° C. The yield of the polymer was 20.9 g. As measured by differential scanning calorimetry (DSC), the polymer displayed a first melting temperature of 45° C. and a second melting temperature of 96° C. The infrared spectroscopic analysis of the polymer in carbon disulfide indicated a cis-1,4-linkage content of 2.14%, a trans-1,4-linkage content of 93.82%, and a 1,2-linkage content of 4.04%. The properties of the polymer are summarized in Table I.

TABLE I

| | Experiment No. | | | |
|---|---|---|---|---|
| | 1 | 2 | 3 | 4 |
| Melting temperatures (° C.) | 45, 96 | 45, 93 | 47, 94, 140 | 45, 93, 140 |
| cis-1,4-linkage (%) | 2.2 | 2.1 | 2.7 | 2.0 |
| trans-1,4-linkage (%) | 93.8 | 93.8 | 90.0 | 92.4 |
| 1,2-linkage (%) | 4.0 | 4.1 | 7.3 | 5.6 |

Example 2

Synthesis of Trans-1,4-Polybutadiene

The same procedure as used in Example 1 was used except that the polymerization of 1,3-butadiene into trans-1,4-polybutadiene was conducted for 165 minutes. The yield of the polymer was 23.9 g. The properties of the polymer are summarized in Table I.

Example 3

Synthesis of a Blend of Trans-1,4-Polybutadiene and Syndiotactic 1,2-Polybutadiene A cement of trans-1,4-polybutadiene was prepared by using the same procedure as used in Example 1. The remaining 1,3-butadiene monomer in the cement was then polymerized into syndiotactic 1,2-polybutadiene by adding 0.15 mmol of iron(III) 2-ethylhexanoate, 0.75 mmol of dibutylmagnesium, and 0.75 mmol of bis(triethylsilyl) phosphonate to the cement, followed by tumbling the bottle for 62 minutes in the water bath maintained at 65° C. The resulting polymerization mixture was worked up by using the same procedure as used in Example 1 to give a blend of trans-1,4-polybutadiene and syndiotactic 1,2-polybutadiene. The yield of the polymer blend was 47.2 g. Based on the yield of trans-1,4-polybutadiene in Example 1, it was estimated that the polymer blend contained about 44% of trans-1,4-polybutadiene and about 56% of syndiotactic 1,2-polybutadiene. As measured by differential scanning calorimetry (DSC), the polymer blend displayed a first melting temperature of 47° C. and a second melting temperature of 94° C., both attributable to trans-1,4-polybutadiene, as well as a third melting temperature of 140° C. attributable to syndiotactic 1,2-polybutadiene. The infrared spectroscopic analysis of the soluble fraction of the polymer blend in carbon disulfide indicated a cis-1,4-linkage content of 2.7%, a trans-1,4-linkage content of 90.0%, and a 1,2-linkage content of 7.3%. The properties of the polymer blend are summarized in Table I.

Example 4

Synthesis of a Blend of Trans-1,4-Polybutadiene and Syndiotactic 1,2-Polybutadiene A cement of trans-1,4-polybutadiene was prepared by using the same procedure as used in Example 2. The remaining 1,3-butadiene monomer in the cement was then polymerized into syndiotactic 1,2-polybutadiene by adding 0.15 mmol of iron(III) 2-ethylhexanoate, 0.75 mmol of dibutylmagnesium, and 0.75 mmol of bis(triethylsilyl) phosphonate to the cement, followed by tumbling the bottle for 62 minutes in the water bath maintained at 65° C. The resulting polymerization mixture was worked up by using the same procedure as used in Example 1 to give a blend of trans-1,4-polybutadiene and syndiotactic 1,2-polybutadiene. The yield of the polymer blend was 47.4 g. Based on the yield of trans-1,4-polybutadiene in Example 2, it was estimated that the polymer blend contained about 50% of trans-1,4-polybutadiene and about 50% of syndiotactic 1,2-polybutadiene. As measured by differential scanning calorimetry (DSC), the polymer blend displayed a first melting temperature of 45° C. and a second melting temperature of 93° C., both attributable to trans-1,4-polybutadiene, as well as a third melting temperature of 140° C. attributable to syndiotactic 1,2-polybutadiene. The infrared spectroscopic analysis of the soluble fraction of the polymer blend in carbon disulfide indicated a cis-1,4-linkage content of 2.0%, a trans-1,4-linkage content of 92.4%, and a 1,2-linkage content of 5.6%. The properties of the polymer blend are summarized in Table I.

Various modifications and alterations that do not depart from the scope and spirit of this invention will become apparent to those skilled in the art. This invention is not to be duly limited to the illustrative embodiments set forth herein.

What is claimed is:

1. A process for preparing a blend of trans-1,4-polybutadiene and syndiotactic 1,2-polybutadiene, the process comprising the steps of:
   (i) polymerizing 1,3-butadiene in the presence of a lanthanide-based catalyst to form a polymerization mixture including trans-1,4-polybutadiene, where the lanthanide-based catalyst includes (a) a lanthanide-containing compound, and (b) an organomagnesium compound; and
   (ii) polymerizing 1,3-butadiene in the presence of an iron-based catalyst within the polymerization mixture including trans-1,4-polybutadiene to form syndiotactic 1,2-polybutadiene within the polymerization mixture including trans-1,4-polybutadiene and thereby produce a blend of trans-1,4-polybutadiene and syndiotactic 1,2-polybutadiene; where the iron-based catalyst includes (a) an iron-containing compound, (b) an organomagnesium compound, and (c) a silyl phosphonate.

2. The process of claim 1, where the organomagnesium compound is defined by the formula $MgR_2$, where each R independently is a monovalent organic group that is attached to the magnesium atom via a carbon atom.

3. The process of claim 1, where the organomagnesium compound is defined by the formula $RMgX$, where R is a monovalent organic group that is attached to the magnesium atom via a carbon atom, and X is a hydrogen atom, a carboxylate group, an alkoxide group, or an aryloxide group.

4. The process of claim 1, where the silyl phosphonate compound is defined by the formula

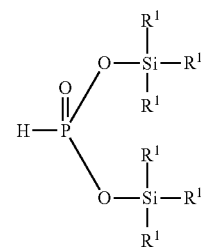

where each $R^1$, which may be the same or different, is a hydrogen atom or a mono-valent organic group.

5. The process of claim 1, where the silyl phosphonate compound is defined by the formula

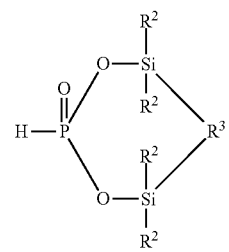

where each $R^2$, which may be the same or different, is a hydrogen atom or a mono-valent organic group, and $R^3$ is a bond or a divalent organic group.

6. The process of claim 1, where the organomagnesium compound is defined by the formula $MgR_2$, where each R independently is a monovalent organic group that is attached to the magnesium atom via a carbon atom.

7. The process of claim 1, where the organomagnesium compound is defined by the formula RMgX, where R is a monovalent organic group that is attached to the magnesium atom via a carbon atom, and X is a hydrogen atom, a carboxylate group, an alkoxide group, or an aryloxide group.

8. The process of claim 1, where said step of polymerizing 1,3-butadiene in the presence of a lanthanide-based catalyst takes place within a first vessel, and where said step of polymerizing 1,3-butadiene in the presence of an iron-based catalyst takes place within a second vessel.

9. The process of claim 8, where the polymerization mixture including a trans-1,4-polybutadiene is transferred from the first vessel to the second vessel without quenching the polymerization mixture or the trans-1,4-polybutadiene.

10. The process of claim 1, where said step of polymerizing 1,3-butadiene in the presence of a lanthanide-based catalyst and said step of polymerizing 1,3-butadiene in the presence of an iron-based catalyst takes place within a single vessel.

11. The process of claim 1, where said step of polymerizing 1,3-butadiene in the presence of a lanthanide-based catalyst takes place within a first zone of a reactor, and where said step of polymerizing 1,3-butadiene in the presence of an iron-based catalyst takes place within a second zone of the reactor.

12. A process for preparing a blend of trans-1,4-polybutadiene and syndiotactic 1,2-polybutadiene, the process comprising:
(i) introducing a lanthanide-based catalyst and 1,3-butadiene monomer to form a polymerization mixture, where the lanthanide-based catalyst includes (a) a lanthanide-containing compound, and (b) an organomagnesium compound;
(ii) allowing the 1,3-butadiene monomer to polymerize to form trans-1,4-polybutadiene and thereby form a polymerization mixture including trans-1,4-polybutadiene;
(iii) introducing an iron-based catalyst to the polymerization mixture including the trans-1,4-polybutadiene, where the iron-based catalyst includes (a) an iron-containing compound, (b) an organomagnesium compound, and (c) a silyl phosphonate, where the silyl phosphonate is selected from silyl phosphonate compounds defined by one of the formulae

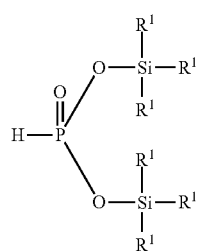

where each $R^1$, which may be the same or different, is a hydrogen atom or a mono-valent organic group, or

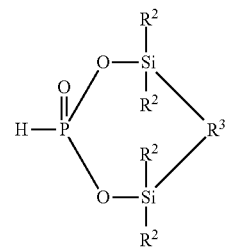

where each $R^2$, which may be the same or different, is a hydrogen atom or a mono-valent organic group, and $R^3$ is a bond or a divalent organic group; and
(iv) allowing the 1,3-butadiene monomer to polymerize to form syndiotactic 1,2-polybutadiene within the polymerization mixture including the trans-1,4-polybutadiene.

13. The process of claim 12, where said step of introducing an iron-based catalyst takes place after the conversion of 1,3-butadiene monomer to trans-1,4-polybutadiene reaches at least 5% and before the conversion of 1,3-butadiene to trans-1,4-polybutadiene reaches at most 90%.

14. A process for preparing a blend of trans-1,4-polybutadiene and syndiotactic 1,2-polybutadiene, the process comprising:
(i) providing an active polymerization mixture including a propagating trans-1,4-polybutadiene polymer, where the lanthanide-based catalyst includes (a) a lanthanide-containing compound, and (b) an organomagnesium compound; and
(ii) adding an iron-based catalyst to the active polymerization mixture including the propagating trans-1,4-polybutadiene polymer, where the iron-based catalyst includes (a) an iron-containing compound, (b) an organomagnesium compound, and (c) a silyl phosphonate, where the silyl phosphonate is selected from silyl phosphonate compounds defined by one of the formulae

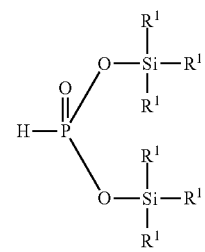

where each $R^1$, which may be the same or different, is a hydrogen atom or a mono-valent organic group, or

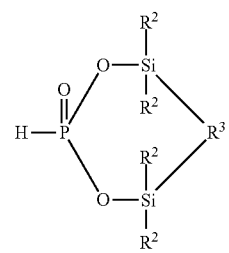

where each $R^2$, which may be the same or different, is a hydrogen atom or a mono-valent organic group, and $R^3$ is a bond or a divalent organic group.

15. The process of claim 14, further comprising the step of adding 1,3-butadiene monomer to the active polymerization mixture.

16. A vulcanizable composition comprising:
the blend of trans-1,4-polybutadiene and syndiotactic 1,2-polybutadiene prepared by a process for preparing a blend of trans-1,4-polybutadiene and syndiotactic 1,2-polybutadiene, the process comprising the steps of:
 (i) polymerizing 1,3-butadiene in the presence of a lanthanide-based catalyst to form a polymerization mixture including trans-1,4-polybutadiene, and
 (ii) polymerizing 1,3-butadiene in the presence of an iron-based catalyst within the polymerization mixture including trans-1,4-polybutadiene to form syndiotactic 1,2-polybutadiene within the polymerization mixture including trans-1,4-polybutadiene and thereby produce a blend of trans-1,4-polybutadiene and syndiotactic 1,2-polybutadiene, a filler, and a curative.

17. A tire component prepared by employing the blend of trans-1,4-polybutadiene and syndiotactic 1,2-polybutadiene prepared by a process for preparing a blend of trans-1,4-polybutadiene and syndiotactic 1,2-polybutadiene, the process comprising the steps of:
 (i) polymerizing 1,3-butadiene in the presence of a lanthanide-based catalyst to form a polymerization mixture including trans-1,4-polybutadiene, and
 (ii) polymerizing 1,3-butadiene in the presence of an iron-based catalyst within the polymerization mixture including trans-1,4-polybutadiene to form syndiotactic 1,2-polybutadiene within the polymerization mixture including trans-1,4-polybutadiene and thereby produce a blend of trans-1,4-polybutadiene and syndiotactic 1,2-polybutadiene.

18. An airspring component prepared by employing the blend of trans-1,4-polybutadiene and syndiotactic 1,2-polybutadiene prepared by a process for preparing a blend of trans-1,4-polybutadiene and syndiotactic 1,2-polybutadiene, the process comprising the steps of:
 (i) polymerizing 1,3-butadiene in the presence of a lanthanide-based catalyst to form a polymerization mixture including trans-1,4-polybutadiene, and
 (ii) polymerizing 1,3-butadiene in the presence of an iron-based catalyst within the polymerization mixture including trans-1,4-polybutadiene to form syndiotactic 1,2-polybutadiene within the polymerization mixture including trans-1,4-polybutadiene and thereby produce a blend of trans-1,4-polybutadiene and syndiotactic 1,2-polybutadiene.

\* \* \* \* \*